(No Model.)

O. H. JEWELL.

APPARATUS FOR PURIFYING WATER.

No. 386,073. Patented July 10, 1888.

Witnesses

Inventor
Omar H. Jewell.

By Coburn Thacher
Att'ys.

UNITED STATES PATENT OFFICE.

OMAR H. JEWELL, OF CHICAGO, ILLINOIS, ASSIGNOR TO THE JEWELL PURE WATER COMPANY, OF SAME PLACE.

APPARATUS FOR PURIFYING WATER.

SPECIFICATION forming part of Letters Patent No. 386,073, dated July 10, 1888.

Application filed December 17, 1887. Serial No. 258,239. (No model.)

*To all whom it may concern:*

Be it known that I, OMAR H. JEWELL, a citizen of the United States, residing at Chicago, in the county of Cook and State of Illinois, have invented a certain new and useful Improvement in Apparatus for Purifying and Filtering Water, which is fully set forth in the following specification, reference being had to the accompanying drawings, in which—

Figure 1:
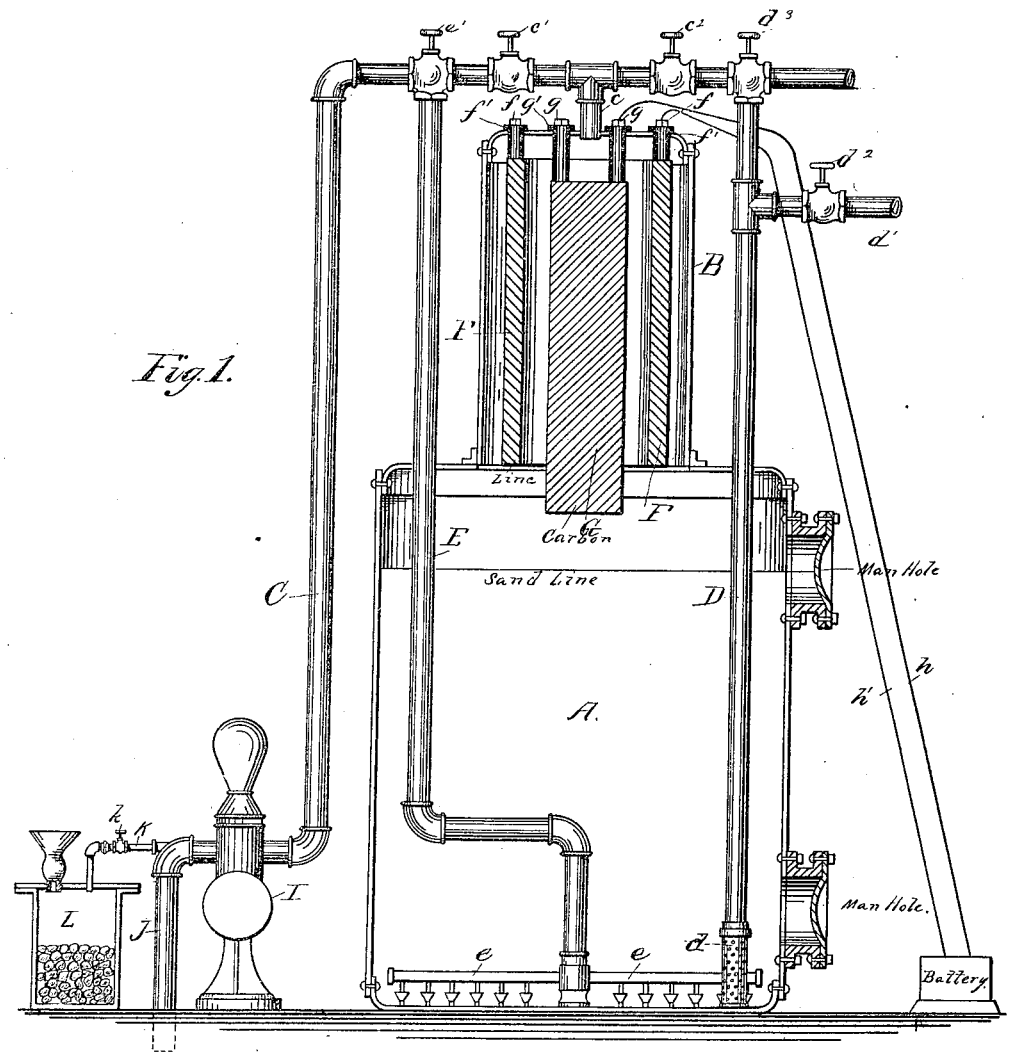
Figure 2:
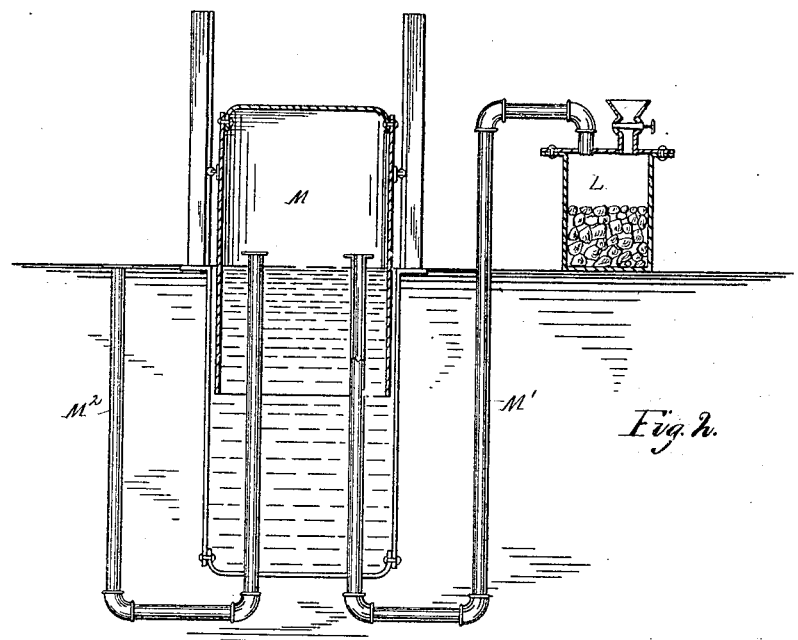

Figure 1 represents a vertical section of a filtering apparatus embodying my present improvements, and Fig. 2 a similar section of an attachment of the apparatus for special uses.

Like letters refer to like parts in all the figures of the drawings.

My invention relates to a filtering apparatus adapted to carry out the process for purifying and filtering water, which forms the subject-matter of an application for patent by myself and William M. Jewell, filed December 7, 1887, Serial No. 257,258.

My present invention has for its object to provide an apparatus of this description by means of which the process referred to may be efficiently carried out; and to that end my invention consists in certain novel features, which I will now proceed to describe, and will then particularly point out in the claims.

Referring now to the drawings, A represents a filter-tank, of any convenient form, which is filled with gravel and sand, or any other filtering material, up to about the line 1 1, (shown in Fig. 1 of the drawings,) which may be called the "sand-line." In this instance the tank is surmounted by a dome, B, somewhat smaller in cross-section than the tank and open at its bottom into the latter. A feed-pipe, C, supplies water to the filter, a service-pipe, c, extending from the latter, being tapped into the top of the tank-dome. A pipe, D, extends down through the top of the tank to the bottom of the latter, where it is provided with a perforated bucket or chamber, $d$, whereby the water filtering down through the sand is collected. This pipe is the discharge-pipe of the filter, and is provided with a service-pipe, $d'$, leading off from the pipe D to any desired point, and provided with a valve, $d^2$, by means of which discharge through this pipe may be closed. The pipe D extends upward and connects with the upper branch of the feed-pipe B, a suitable cock, $d^3$, being provided at this point for opening or closing communication between the two pipes, as may be desired. Another pipe, E, is also connected with the upper branch of the feed-pipe and extended downward into the tank. This is the wash-pipe, and is passed down to the bottom of the tank, where it is provided with a distributer, $e$, whereby water forced down through the pipe may be evenly distributed about the area of the tank and through the same for the well-known process of washing. The particular construction of this distributer is immaterial, as it is no part of my present invention, and requires no detailed description here. At the point of union between the feed-pipe and wash-pipe there is also a suitable cock, $e'$, by means of which the supply of water through the pipe C may be directed down through the wash-pipe.

In the dome B of the filter-tank are arranged two electrodes. One of these is a hollow cylinder, F, of zinc, the diameter of which is slightly less than that of the dome, while its length is about the same as the height of the latter. This electrode is suspended from the top of the dome by bolts or rods $f$, properly insulated from the dome itself by insulators $f'$. The cylinder does not extend quite to the top of the dome, so that a slight space will be left between it and the dome in all directions. The other electrode, G, is a solid cylinder of carbon, and is of less diameter than the zinc electrode F, within which it is arranged, being also suspended by bolts or rods $g$ from the top of the dome, which are insulated from the latter by insulators $g'$.

The upper end of the carbon electrode does not extend up quite flush with that of the zinc, and, as seen in Fig. 1 of the drawings, this electrode is arranged directly underneath the service-pipe, which delivers water into the filter.

An electric battery, H, or other electric generator, is provided, of such power as may be required, the respective poles of which are connected by wires $h$ $h'$ to the respective electrodes G and F. The upper branch of the feed-pipe C is provided with valve-cocks $c'$ $c^2$, arranged, respectively, in front of and behind the service-pipe c, the first being between said pipe and the junction between the wash-pipe and feed-pipe, and the second between the feed-pipe and the junction of the discharge-pipe with the feed-pipe, for purposes, in operating the filter, which will hereinafter appear. Water is preferably delivered to the filter by means of a pump, I, though of course it will be understood that the delivery may be effected in any suitable way, it being desirable, however, that it should be under pressure. In case the introduction of a reagent is necessary I prefer to charge the water with the reagent before it enters the filter, and for some reasons I think it desirable to introduce the reagent before the water enters the pump, for then there is a thorough mixture by the agitation of the water as it passes through the pumping apparatus. I have shown this arrangement of the devices in the drawings, wherein J represents the suction-pipe of the pump into which a pipe, K, is tapped, which is suitably connected with a tank or receiver containing the reagent which is to be introduced. The reagent will sometimes be a liquid and sometimes a gas, and it will be understood, of course, that the receiver and apparatus for introducing the substance into the water will be varied, so as to adapt them to the particular substance required.

The apparatus shown in the drawings is intended to illustrate devices for the introduction of a gaseous reagent, L, in Fig. 1, indicating a suitable generator for the production of the gas required, and from which communication is made to the suction-pipe by means of the pipe K, which is provided with a suitable cock, k.

It may be desirable to provide a suitable receiver or gasometer for collecting and retaining a quantity of gas. I have shown such an additional device in Fig. 2 of the drawings, in which the generator L is connected with a receiver, M, of any ordinary construction, adapted to receive, retain, and deliver gas. This connection is effected by means of a suitable pipe, M', and the receiver is connected with the suction-pipe of the pump by means of a pipe, M².

In case the reagent is in liquid form the receiver in which it is held is connected with the suction-pipe, and the receiver is so located that the liquid will be drawn into the suction-pipe in such quantities as may be desired by the action of the pump.

For the purpose of illustrating the action of my apparatus I will describe its operation in a particular instance. For this purpose an apparatus has been illustrated by the drawings adapted for the treatment of ordinary salt-water—that is, water impregnated with common salt. Common salt is chloride of sodium, and of course the decomposition of common salt-water effected by electrolysis produces chlorine and sodium. Now if a proper reagent is present it will unite with the sodium, while the chlorine, being a gas, will escape from the water as opportunity is afforded. The required reagent is found in carbonic-acid gas, or rather an excess of this substance. This gas is produced in the generator L in any cheap way. A well-known method is the treatment of chalk or limestone with sulphuric acid. This gas is delivered by the pipe K to the suction-pipe J of the pump, which extends to the reservoir of salt-water, and the construction and arrangement of the devices are such that by the action of the pump the water will be highly charged with the gas. The water in this condition is delivered by the action of the pump into the dome of the filter, where the electrolytic action, described in detail in the application hereinbefore referred to, takes place. The carbonic-acid gas present in excess immediately unites with the sodium set free and forms an insoluble bicarbonate of soda, which is precipitated or caught by the filtering material below, through which the water subsequently passes. Pure fresh water will be discharged from the service-pipe $d^2$, and the chlorine gas, if any remains in the water, will immediately escape when relieved from pressure which may exist in the purifying apparatus.

The use of the stop-cocks mentioned in this description I will briefly state, though they constitute no part of the present invention. In the working operation of the apparatus the valve-cock $c'$ is open and $c^2$ closed, while $e'$ is turned so as to close the pipe E, but leave a passage directly through the feed-pipe open. The cock $d^3$ is adjusted to close the opening from the pipe D into the feed pipe, and $d^2$ is open to permit the discharge from the apparatus. When it is desired for any purpose to shut off water from the filter, it is evident that if $c^2$ and $d^3$ are open the discharge will be directly through the pipe C without going round through the filter. When it is desired to wash the filter, $c'$ and $d^2$ are closed, $e'$ is opened to make connection with the wash-pipe, $d^3$ is closed to the pipe D, and $c^2$ is opened, so that obviously water may be passed freely up through the sand and top of the filter out through the discharge end of the feed-pipe until the washing is completed. When filtering is commenced again, it is desirable at first to open only $d^3$, letting the discharge be for a time through this outlet.

The form of apparatus shown and described is particularly adapted for the treatment of ordinary salt-water, as has already been stated; but it is obvious that by slight changes in the details or accessories of the apparatus it may be adapted for the treatment of different solutions, or it may be employed in the form shown and described for treating other solutions by simply changing the reagent.

It is obvious that various modifications in the construction shown and described may be made without departing from the principle of my invention. For example, in some instances the filtering portion of the apparatus may be dispensed with, and in other cases the devices for producing and introducing the reagent may be omitted. The details of the construction may also be varied, and I therefore do not wish to be understood as limiting myself strictly to the precise details hereinbefore described, and shown in the drawings.

Having thus described my invention, what I claim as new, and desire to secure by Letters Patent, is—

1. In an apparatus for purifying water, the combination, with the filter-tank containing a suitable filtering medium and provided with a discharge or outlet pipe, of the dome mounted on said filtering-tank and communicating therewith, a supply or inlet pipe opening into said dome, and suitable electrodes arranged in said dome and connected to a battery or other source of electricity, substantially as and for the purposes specified.

2. In an apparatus for purifying water, the combination, with the filtering-tank A and dome B, of the hollow cylindrical electrode F, arranged in said dome and connected to one pole of the battery, and the cylindrical electrode G, arranged within the electrode F and connected to the other pole of the battery, substantially as and for the purposes specified.

3. In an apparatus for purifying water, the combination, with the filtering-tank and its discharge-pipe, of the electrodes arranged therein and connected to the battery or other source of electricity, a supply-pipe connected to said tank, and a reagent-receiver connected to the supply-pipe, substantially as and for the purposes specified.

4. In an apparatus for purifying water, the combination, with the filtering-tank and its supply and discharge pipes, of suitable electrodes arranged in said tank and connected to a battery or other source of electricity, a pump connected to the supply-pipe, and a suitable reagent receiver or generator connected to the suction-pipe of the pump, substantially as and for the purposes specified.

5. In an apparatus for purifying water, the combination, with the filtering-tank A, of suitable electrodes arranged therein and connected to a battery or other source of electricity, a supply-pipe for said tank, a receiver, M, connected to said supply-pipe, and a generator, I, connected to said receiver, substantially as and for the purposes specified.

OMAR H. JEWELL.

Witnesses:
IRVINE MILLER,
CARRIE FEIGEL.